United States Patent [19]

Futter

[11] 4,284,285
[45] Aug. 18, 1981

[54] SELF-ADJUSTING ROTARY CHUCK

[76] Inventor: Friedrich P. Futter, 5115 N. 40th St. (E 204), Phoenix, Ariz. 85018

[21] Appl. No.: 36,501

[22] Filed: May 7, 1979

[51] Int. Cl.³ ..................... B23B 31/08; B23B 31/19
[52] U.S. Cl. ................................. 279/62; 279/1 B; 279/60
[58] Field of Search ............... 279/60, 61, 62, 1 B, 279/1 ME, 28

[56] References Cited
U.S. PATENT DOCUMENTS

| 310,987 | 1/1885 | Church | 279/60 |
|---|---|---|---|
| 1,396,022 | 11/1921 | Carriere | 279/60 |

FOREIGN PATENT DOCUMENTS

| 588515 | 5/1947 | United Kingdom | 279/60 |
|---|---|---|---|
| 656192 | 8/1951 | United Kingdom | 279/60 |

Primary Examiner—William R. Briggs
Attorney, Agent, or Firm—Drummond and Nelson

[57] ABSTRACT

A chuck having self-closing jaws, and a key-threaded rotary ring to engage said jaws in working contact with a tool within their grasp or to disengage said jaws so as to permit their free movement. The jaws themselves are such that the act of performing work with a tool held by said jaws increases the holding pressure exerted by said jaws on said tool.

1 Claim, 10 Drawing Figures

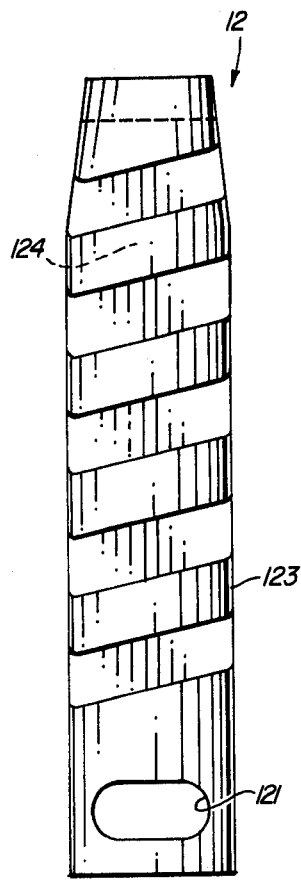
FIG-3
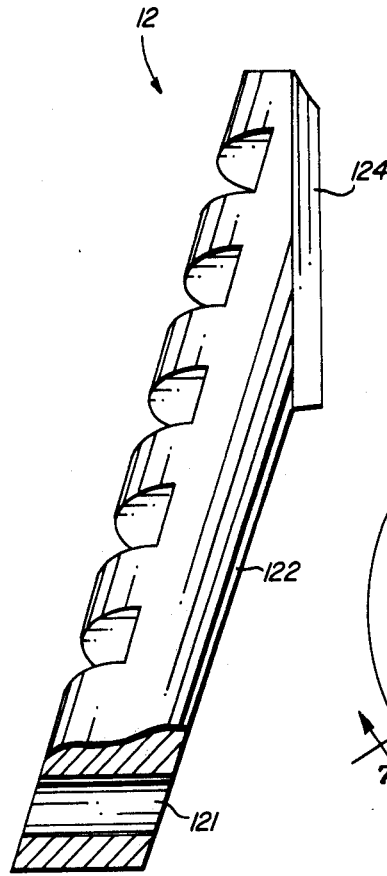
FIG-4
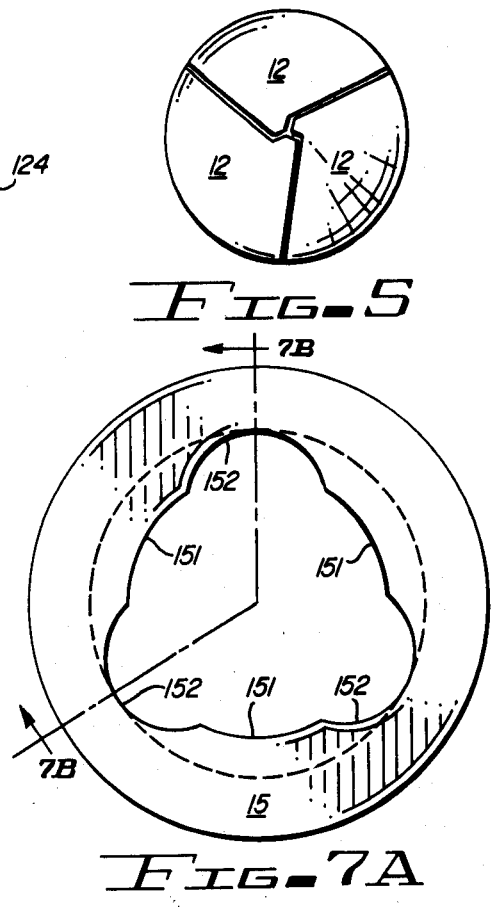
FIG-5
FIG-7A
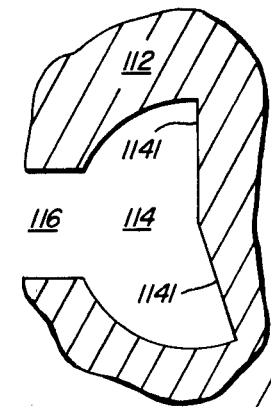
FIG-8
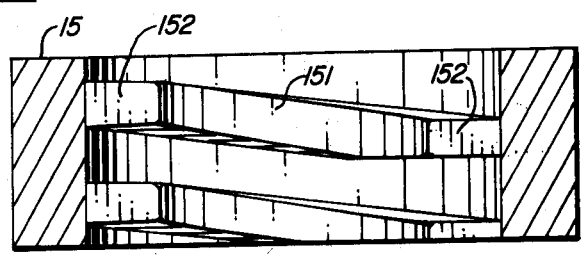
FIG-7B
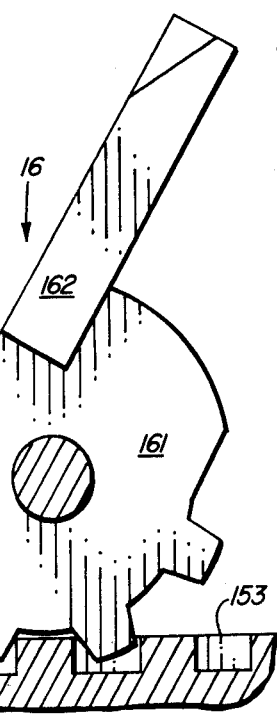
FIG-6A
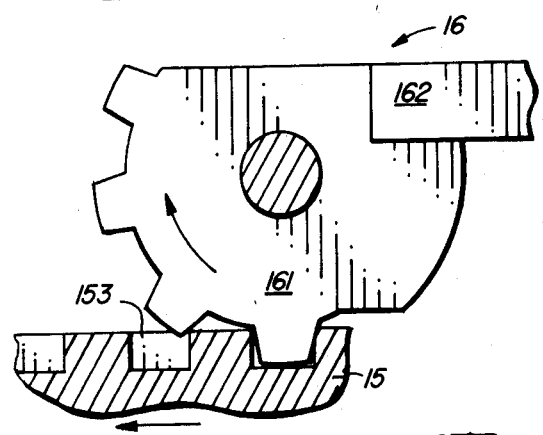
FIG-6B

SELF-ADJUSTING ROTARY CHUCK

This invention relates to an improved chuck for holding a work piece or a tool in a machine.

In particular the invention relates to a chuck requiring no separate, accompanying key device to adjust the jaws of the chuck to the work piece or tool in use.

Even more particularly the invention relates to a chuck in which the adjustment of the holding jaws to the work piece or tool in use is automatic and is accomplished by the mere insertion of the work piece or tool into the embrace of the holding jaws.

In its most important aspect the invention relates to a chuck employing a lever-actuated, key-threaded rotary ring to establish the holding force experienced by the work piece or tool while it is in the embrace of the holding jaws.

The Jacob's Chuck has been a familiar and useful tool employed by generations of craftsmen and of handymen in general. It has withstood the test of time. Its appearance has changed in little-if-any respect over the years. It is an oblique reciprocating jaw chuck. A key, maintained in the vicinity in which the chuck is to be used, when inserted into the chuck and rotated, causes the oblique jaws to extend from or retract into the body of the chuck. Since their movement is oblique, the jaws tend to draw closer together, as they withdraw from the body of the chuck, until they are in intimate contact; when withdrawn, the jaws are also drawn further apart from their mates. In this manner the jaws may be made to bear against, and to engage tightly, the body of a tool or workpiece placed within their grasp.

The most often encountered problem in using prior art chucks, such as the Jacob's Chuck, was the misplacement of the key. The chuck key was more often cursed for its absence than it was blessed for its usefulness. Workmen expended much innovative effort in attempts to see that the key remained with the chuck. While such efforts were often successful in meeting the fundamental requirement that the key be with the chuck when the need for its use arose, a secondary problem came about in that the means for assuring the presence of the key often made use of the key and chuck awkward.

The key presented an even more dangerous problem when the craftsman, in using it to lock a tool or workpiece in place, would fail to remove the key from the chuck before starting the drive motor to which the chuck was invariably attached. It was in just this manner that many a neophyte workman launched his first flying missile. Indeed, failure to remove the chuck key from the chuck prior to starting the drive motor was not limited to the uninitiated craftsman. Many a vertran worker was prone to commit the error repeatedly. These events reoccurred, often with drastic results to the psyiognomy of the craftsman or his unfortunate coworkers. An innovation of fairly recent origin uses the chuck key both for its original purpose and as an interlock device which must be in place before the drive motor can be energized. This effectively satisfied two of the earlier problems: the chuck key was usually in place where you expected it to be, and it was impossible to start the drive motor without first removing the chuck key from the chuck and placing it in its interlock position.

Another complaint often arose when the worker was performing operations which required frequent changing of the tools held by the chuck. Thus, in precision drilling of a ½ inch diameter hole in certain materials, the craftsman might, of necessity, have to drill a ⅛th inch diameter pilot hole which would be used to lead a ¼th inch diameter pilot drill to prepare a pilot hole for a 31/32 inch diameter pilot drill to prepare the way for the finish drilling by a ½ inch diameter drill. All of which would require multiple use of the chuck key and adjustments of the chuck.

It was with the view of obviating the problems inherent with earlier, prior art chucks, that I set as a primary object of my invention the elimination of the chuck key with its susceptibility to become lost or to cause physical injury to the user or his coworkers.

It is a further object of my invention that the holding jaws of my chuck should automatically adjust themselves to the proper size to hold the tool placed within their embrace.

It is a further object of my invention that the act of placing and positively locking a tool within the grasp of the chuck shall be a simple and speedy operation.

These and other objects and advantages of the invention will be apparent to those skilled in the art from the following detailed description thereof, taken in conjunction with the drawings, in which:

FIG. 3 and FIG. 4 are front and side elevations of a holding jaw showing the key threads in greater detail than that presented in FIG. 2.

FIG. 5 is a plan view of a nested set of three holding jaws depicting them in their normally closed position.

FIG. 6A shows the chuck lock lever engaged with the jaw adjustment control ring.

FIG. 6B shows the movement imparted to the jaw adjustment control ring when the chuck lock lever is rotated down to its normal, chuck-operating position.

FIG. 7A shows the jaws adjustment control ring.

FIG. 7B is a sectional drawing of the jaw adjustment control ring detailing the structure which provides for engagement and dis-engagement of the key threads of the jaw adjustment control ring and the chuck holding jaws.

Figure 1:
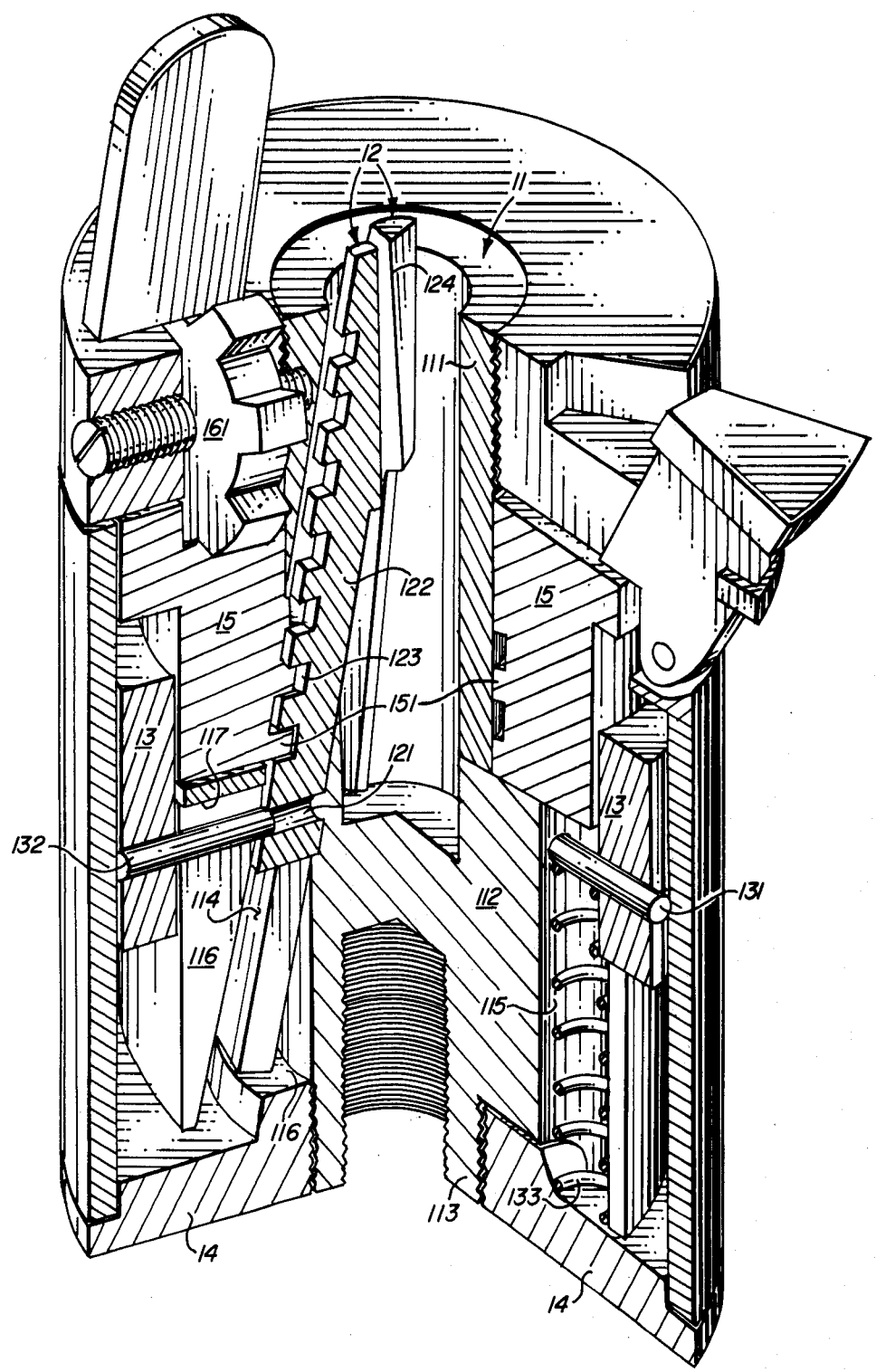
FIG. 1 is a partial-sectional drawing of a perspective view of an embodiment of the Futter Chuck.

FIG. 8 details the broached jaw-slot.

In the drawings like-reference numerals are consistently used in conjunction with identical elements of the improved rotary chuck disclosed herein.

In summary description, the invention resembles a conventional chuck with the distinguishing characteristic that the holding jaws are provided with means for moving them to a normally-closed position unless otherwise restrained from doing so. The tendency of the jaws to move to a closed position is easily overcome by the insertion of a tool or workpiece into the grasp of the jaws. In this event the means for moving the jaws to a closed position will maintain the jaws in holding-contact with said workpiece or tool. A disengaging, key-threaded, jaw-restraining means is also provided. These key threads mate with complementary key threads on the movable jaws of the chuck. When the key threads of the jaw-restraining means and of the movable jaws are engaged, the jaws are forcibly drawn together so as to hold and securely maintain any workpiece or tool within their grasp. Disengaging the key threads frees the jaws of restraint and permits the tool or workpiece to be drawn easily from the grasp of the jaws, the jaws then continuing to move to their normally-closed position.

A greater understanding of the invention, and its innovative concepts, may be gleaned from a study of the accompanying drawings and the detailed description which follows.

The assembled chuck is denoted by the general reference 10. The chuck is comprised of head 11 which is made up of an upper threaded section 111, a massive central section 112, and a lower threaded section 113. Head 11 has a hollow central core. Slots 114 are broached obliquely through the walls of said central core.

Slots 114 each slidably accepts a holding jaw 12, three of which are illustrated in the embodiment herein disclosed.

The central section 112 of head 11 contains, in the embodiment illustrated, six vertical slots. Three slots 115, two of which are illustrated, are utilized as spring cylinders. The three spring cylinder slots 115 in the embodiment disclosed herein are opened at each end. The three remaining slots 116 in section 112 are open ended at their lower ends, in the configuration illustrated, but are closed at their upper extremity. This closed extremity 117 will be utilized as a mechanical stop as will be shown in the discussion following.

Jaw adjustment control ring 13 is positioned slidably about central section 112 of head 11. Jaw adjustment control ring 13 accepts two sets of three pins: spring guide pins 131, and jaw adjustment pins 132. When springs 133 are emplaced in spring cylinders 115, spring guide pins 131 bear supportably on springs 133, as is best seen in FIG. 1. Jaw adjustment pins 132 pass through ring 13 and into slots 116 where they couple with pin receptacle 121 of jaw shaft 122.

The cooperative action of jaw adjustment control ring 13, its elements, and holding jaws 12 may now be seen. With bottom cap 14 thread-fastened securely to the lower section 113 of head 11, springs 133 are captivated within spring cylinders 115 and will provide support for spring guide pins 131 and maintain jaw adjusting control ring 13 in a raised position. This in turn, via the action of jaw adjustment pins 132, will support jaws 12 in their raised or closed position.

When a downward pressure is exerted at the top of jaws 12, as would occur if one attempted to press a tool down and into the grasp of jaws 12, jaws 12 will move obliquely downward, being guided by broached slots 114. This in turn causes a downward force to bear on jaw adjustment control ring 13 and the consequent compression of spring 133 through the action of spring guide pins 131 thereon.

When the downward force is removed from the top of jaws 12, springs 133 return to their normal, non-compressed state raising jaw adjustment control ring 13 and causing jaw 12 to extend once more to their normally closed positions. When a tool is pressed downward and into the embrace of jaws 12, the force exerted by the subsequent compression of spring 113 maintains the jaws in contact with the tool surface thereby causing the jaws to provide support for the tool. The spring tension is such that while the jaws provide adequate support for a tool left within their embrace, said tool may be readily removed from the grasp of said jaws by the exertion of an easy upward pull on said tool. As is already apparent, the removal of the tool will permit jaws 12 to move once more to their normally closed position.

The contact pressure afforded between the surface of the tool and jaws 12 by the compression of springs 113 is not adequate to permit the performance of work with the tool so held. Means must be provided to move the jaws into greater bearing contact with the surface of the tool so as to maintain the tool in place during the performance of work.

A disengaging, jaw-restraining rotary ring 15 is emplaced down and about upper threaded section 111 of head 11. Rotary ring 15 carries key threads 151 which engage mating key threads 123 on holding jaws 12. Rotary ring 15 is configured such that its rotation about the central axis of the chuck will, if rotated in one direction, cause key threads 151 to engage with the mating key threads 123 of jaws 12, locking jaws 12 in position and causing them to bear down against any tool within the grasp of jaws 12 so as to permit the performance of work with the tool so held. When rotary ring 15 is rotated about the central axis of the chuck, in a direction opposite to that just described, key threads 151 will disengage from mating key threads 123 in jaws 12. The manner in which this is accomplished is best seen in FIGS. 7A and 7B.

Rotary ring 15 contains disengaging sections 152 having outlines which conform in general to those of obliquely broached slots 114 in head 11. Since the configuration of disengaging sections 152 agree with that of broached slot 114 jaws 12 are free to move obliquely in the manner just heretofore described. It may thus be seen that with rotary ring 15 in the disengaging position jaws 12 are free to move slidably down into the chuck in response to the pressure of a tool being inserted within the grasp of jaws 12, and may rise freely under the influence of springs 133 when the downward pressure on the jaws is relieved. Rotating disengaging, jaw-restraining rotary ring 15 to its engaging position will now cause the jaws to bear strongly against the tool within the grasp of jaws 12 with such bearing force as to permit the performance of work.

What has been now disclosed is a key-threaded rotary ring chuck which is believed to offer a significant advancement over prior art chucks. Means for rotating ring 15 so as to engage or disengage the key threads of key-threaded rotary ring 15 and the mating key threads 123 of jaws 12, which means will be integral with said chuck, will not be disclosed. However, it is recognized that the incorporation of means to rotate rotary ring 15 as an integral part of the chuck housing may, in practice, be impractical when practicing the invention, as thus far disclosed, in chucks of small size. In the case of such small chucks, an independent, separable chuck key may be provided and utilized. For larger size chucks, the integral rotary ring chuck key will now be described.

Figure 2:
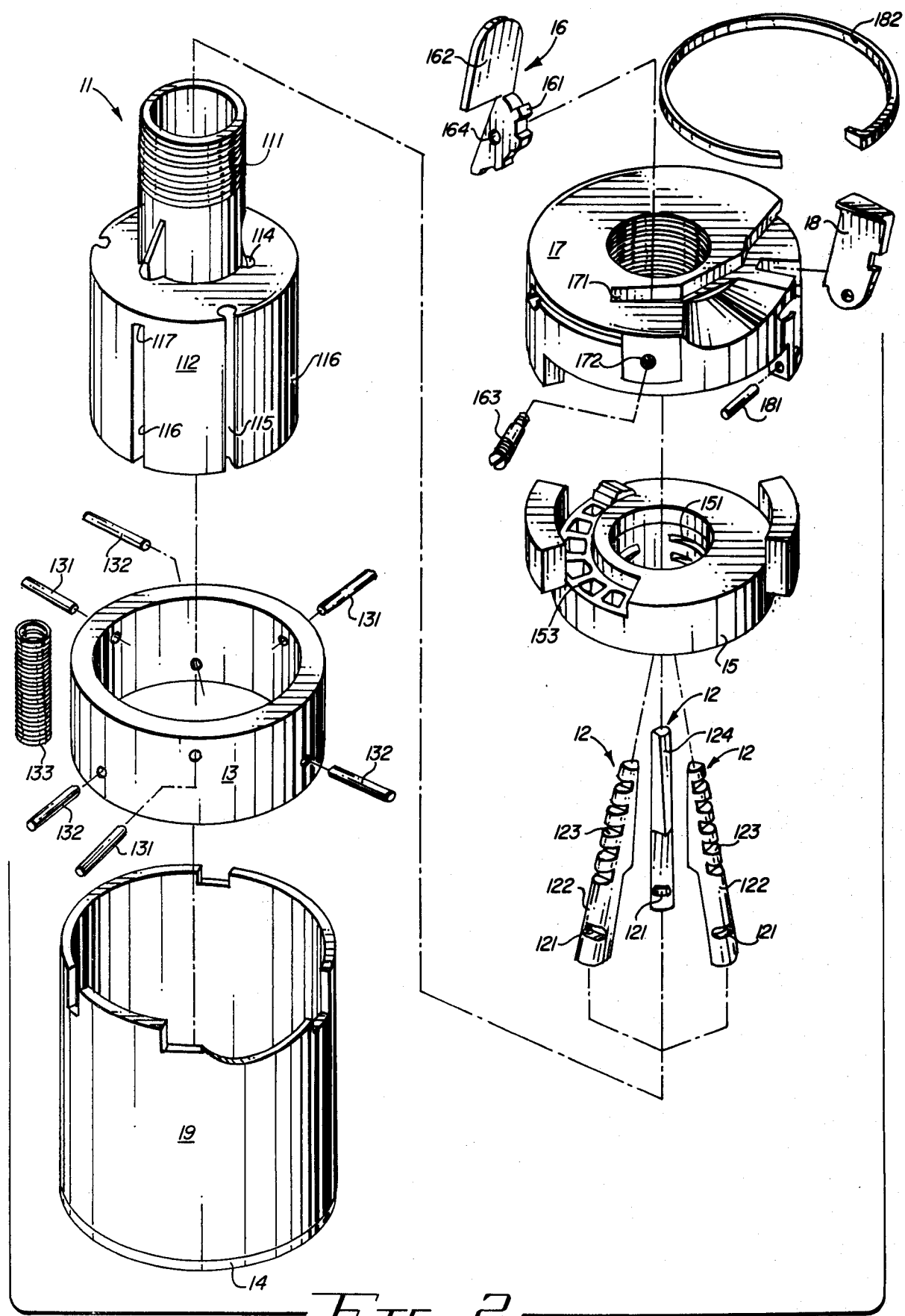
FIG. 2 is an exploded view indicating details of important component parts of the embodiment of the Futter Chuck illustrated in FIG. 1.

Key-threaded rotary ring 15 is provided with a circular rack gear 153 which will engage pinion gear 161 to be described below. Chuck 10 is capped by end cap 17 which is thread fastened to upper threaded section 111 of head 11. When so emplaced, it is situated directly above key-threaded rotary ring 15 in the configuration illustrated in FIGS. 1 and 2. When so assembled, a slot 171 will be positioned directly above a portion of rack gear 153 on rotary ring 15. Lock lever 16, comprising pinion gear 161 and actuating lever 162, is made a part of the assembly in inserting pinion gear 161 in slot 171 of end cap 17 and affixing it in a freely rotatable position by inserting lock lever pin 163 through threaded opening 172 of end cap 17. Lock lever pin 163 will pass through central opening 164 of pinion gear 161 when it is so emplaced in slot 171. Lock lever pin 163 extends through the inner threaded wall of end cap 17 and into upper threaded section 111 of head 11. Lock lever pin 163 thus serves the dual function of providing a pivot about which pinion gear 161 may rotate as well as the means for locking end cap 17 in position on head 11.

When pinion gear 161 is emplaced in slot 171 as just described, it will engage with rack gear 153 on rotary ring 15. Rotation of pinion gear 161 is provided by actuating lever 162 which may be raised to rotate key-threaded rotary ring 15 to the disengaging position, or lowered, so as to be flush with the surface of end cap 17 when key-threaded rotary ring 15 is in the position in which its key threads 151 are locked in engagement with mating key threads 123 of holding jaws 12. The action of lock lever 16 and rotary ring 15 is best illustrated in FIGS. 6A and 6B.

To assure that lock lever 16 remains flush with the surface of end cap 17 and that jaws 12 are maintained locked in their holding position while the chuck is being used in the performance of work, latch 18 is provided which swivels about pin 181 so as to engage actuating lever 162 of lock lever 16 and maintain it in position. Spring 182 is provided to maintain lock lever 18 in its locking position.

The assembly of chuck 10 is complete when outer enclosure 19 is in place. Enclosure 19 is maintained in position when bottom cap 14 is thread fastened to lower threaded section 113 of head 11.

Jaws 12 maintain holding contact with a tool within their grasp along an oblique line 124. This oblique line of contact is advantageous in assuring that any tool placed within the grasp of jaws 12 will be securely locked in position when key-threaded rotary ring 15 is locked in the engaged position. A plan view of jaws 12 in their closed and mated position is illustrated in FIG. 5.

In FIG. 8, a sectional view of the central section 112 of head 11, is detailed broached slot 114 which accommodates shank 122 of jaw 12. As may be seen broached slot 114 is generally semi-circular in cross sectional configuration. A departure from this generally semi-circular cross sectional configuration is introduced by flat surfaces 1141. The flat portion of jaw shank 122 of holding jaw 12 will, in general, move slidably along the line formed by the intersection of flat surfaces 1141 in broach slot 114. When a tool is placed down within the grasp of holding jaws 12, each jaw will make contact with the tool somewhere along oblique line 124 of the holding surface of jaw 12. When key-threaded rotary ring 15 is locked in the engaging position, the holding pressure on the tool along oblique line 124 will be increased and the flat surface of jaw shank 122 will tend to pivot slightly along the line of intersection of flat sections 1141 of broach slot 114. This slight pivoting action will change the actual point of contact between the tool and oblique edge 124 so as to increase the bearing pressure exerted by jaws 12 on said tool. In addition, when the chuck is in use with a tool in place and work is being performed, there is a further tendency for the flat portions of jaw shank 122 to pivot further about the intersection of flat sections 1141 of broached slot 114. Thus, the very act of performing work with a tool emplaced within the grasp of the jaws acts to increase the holding power of jaws 12 on the tool performing the work.

What I have described is a chuck having self-closing jaws, and a key-threaded rotary ring to engage said jaws in working contact with a tool within their grasp or to disengage said jaws so as to permit their free movement. The jaws themselves are such that the act of performing work with a tool held by said jaws increases the holding pressure exerted by said jaws on said tool.

Having described my invention, and illustrated it in such clear and concise manner that those skilled in the art will be enabled to understand and practice it, I claim:

1. In a chuck for releasably holding an object such as a tool or workpiece, including
circumferentially spaced jaws for grasping said object which are
    movable radially outwardly to an open position to permit insertion of said object therebetween, and
    adapted to move radially inwardly to an object-grasping position, and
means for adjusting the radial position of said jaws to grasp objects of varying size,
the improvements comprising:
(a) inclined key threads on said jaws;
(b) a rotatable jaw-positioning collar around said jaws, including inclined, inwardly extending, circumferentially spaced key threads adapted to cooperatively engage and disengage the key threads on said jaws, which collar
    (i) urges said jaws axially outwardly and radially inwardly to said object-grasping position when said collar is rotated to engage said key threads, and
    (ii) permits free axial and radial movement of said jaws to said open position when said collar is rotated to disengage said key threads;
(c) means for rotating said collar to engage and disengage said key threads; and
(d) means for normally yieldably urging said jaws axially outwardly and radially inwardly when said key threads are disengaged.

* * * * *